(12) United States Patent
Berthaud et al.

(10) Patent No.: US 6,922,315 B2
(45) Date of Patent: Jul. 26, 2005

(54) HEAD DRUM WITH MAGNETIC MOUNTING OF ROTARY TRANSFORMER

(75) Inventors: Philippe Berthaud, Tonnerre (FR); Jean-Pierre Collin, Ancy le Franc (FR); Michel Perrot, Tonnerre (FR)

(73) Assignee: Thomson Licensing S.A., Boulogne-Billancourt (FR)

(*) Notice: Subject to any disclaimer, the term of this patent is extended or adjusted under 35 U.S.C. 154(b) by 0 days.

(21) Appl. No.: 10/451,970
(22) PCT Filed: Dec. 15, 2001
(86) PCT No.: PCT/EP01/14828
§ 371 (c)(1), (2), (4) Date: Feb. 12, 2004
(87) PCT Pub. No.: WO02/052548
PCT Pub. Date: Jul. 4, 2002

(65) Prior Publication Data
US 2004/0120080 A1 Jun. 24, 2004

(30) Foreign Application Priority Data
Dec. 27, 2000 (EP) ............................................. 00403678

(51) Int. Cl.⁷ .............................. G11B 5/52; G11B 15/61
(52) U.S. Cl. ................. 360/271.1; 360/271; 360/271.2; 360/130.22; 360/130.24
(58) Field of Search ............................... 360/271, 271.1, 360/271.2, 271.3, 271.4, 271.5, 271.7, 130.1, 130.2, 130.21, 130.22

(56) References Cited

U.S. PATENT DOCUMENTS

| 4,814,917 A | * | 3/1989 | Nonoyama .................... 360/271 |
| 5,086,361 A | * | 2/1992 | Kawada et al. ........... 360/281.2 |
| 5,317,466 A | * | 5/1994 | Hasegawa ................. 360/271.2 |
| 5,715,112 A |   | 2/1998 | Oh ............................... 360/84 |
| 5,719,723 A |   | 2/1998 | Kim ............................. 360/84 |
| 5,734,213 A |   | 3/1998 | Oh ............................... 310/67 |
| 5,936,809 A | * | 8/1999 | Nishida et al. .......... 360/271.1 |

FOREIGN PATENT DOCUMENTS

| EP | 0 273 620 | 7/1988 | ............ G11B/5/52 |
| EP | 0 720 156 | 7/1996 | ............ G11B/5/53 |

* cited by examiner

Primary Examiner—Craig A. Renner
Assistant Examiner—Christopher R. Magee
(74) Attorney, Agent, or Firm—Joseph S. Tripoli; Robert B. Levy; Jorge T. Villabon

(57) ABSTRACT

According to a first aspect the present invention is related to a head drum arrangement allowing a much easier mounting of the rotary transformer. The head drum arrangement comprises a non-rotating lower drum and a rotating upper drum, which are connected by a shaft fixed in the lower drum. The upper drum is mounted on the shaft by a bearing and preferably by two ball bearings. A rotary transformer is arranged between the lower drum and the upper drum having a fixed stator and a rotor rotating jointly with the upper drum. The rotor is non-positively held in its position by the magnetic force of a permanent magnet accommodated in the upper drum.

9 Claims, 2 Drawing Sheets

HEAD DRUM WITH MAGNETIC MOUNTING OF ROTARY TRANSFORMER

This application claims the benefit under 35 U.S.C. §365 of International Application PCT/EP01/14828 filed Dec. 15, 2001, which claims the benefit of European Application No. 00403678.6 filed Dec. 27. 2000.

FIELD OF THE INVENTION

The present invention is related to a head drum for magnetic tape apparatuses. The invention is based on a head drum according to the precharacterizing clause of Patent claim 1. In the following text, a magnetic tape apparatus should be understood as meaning any apparatus in which signals, data or information in analogue and/or digital form are recorded on a magnetic tape and/or read from the latter. Independently of this, these apparatuses may also have other functions, e.g. they may be combined with an electronic camera. According to a second aspect the present invention additionally relates to a magnetic tape apparatus, which is equipped with an inventive head drum.

BACKGROUND OF THE INVENTION

In general a head drum comprises a fixed lower drum and a rotating upper drum, carrying at least two read/write heads in a 180° configuration on its periphery. In operation, a magnetic tape is in contact with at least half of the circumference of the head drum. For the sake of simplicity in the following, the read/write heads will be referred to only as video heads reading signals from the tape. However, it is to be noted that the invention is not limited to reading video signals.

The rotating video heads read signals from the magnetic tape, which have to be transferred to the fixed lower drum, which is connected to signal processing circuitry. It is known to use brushes to transfer the signals between the rotating upper drum and the fixed lower drum. However, in practice the transferred signals are weak and the noise generated by the brushes tends to deteriorate the transferred signals. Furthermore, brushes are not reliable over long periods of time. Therefore, rotary transformers comprising a fixed stator and a rotating rotor are utilized to transmit signals from the rotating upper drum to the fixed lower drum are utilized in today's head drums. In today's head drums the parts of the rotary transformer are fixed either by mechanical means like screws or they are fixed by glue or cement. The first solution requires additional elements and machining of the members to be connected. The second solution needs the handling of potentially hazardous products, e.g. fire hazardous glue. In addition this kind of products usually present problems to the environment.

SUMMARY OF THE INVENTION

It is therefore desirable to provide a head drum in which the rotary transformer is fixed in a simple and cost effective way.

The head drum arrangement comprises a fixed lower drum and a rotating upper drum being connected by a shaft, which is fixed in the lower drum. The upper drum is mounted on the shaft by a bearing. The arrangement further comprises a two-part rotary transformer having a fixed stator associated with the lower drum and rotor rotating jointly and associated with the upper drum. A permanent magnet is in contact with one part of the rotary transformer such that said part is held on the associated drum by the magnetic field of the permanent magnet. In this way advantageously there is no need to use hazardous materials or additional mechanical elements.

In a specific embodiment of the invention the permanent magnet is arranged on the rotating upper drum and it is in contact with the rotor of the rotary transformer such that the rotor is held on the upper drum by the magnetic field of the permanent magnet. A compact structure of the head drum is achievable if the permanent magnet is accommodated in a recess of the upper drum.

The structure of the inventive head drum is particularly simple if the recess to accommodate the magnet is formed by the seat of the bearing. In this case it is possible to support the magnet by the rotating outer ring of the bearing.

It is necessary to avoid any interference between the magnetic fields associated with the read/write heads of the head drum and the magnetic fields of the tape on the one hand and the magnetic field of the permanent magnet on the other hand. Therefore, in another embodiment of the invention the permanent magnet is mounted close to the rotation axis and remote from the magnetic heads mounted on the circumference of the upper drum.

For the same reasons the magnetization of the permanent magnet is selected such that the rotor is securely held on the upper drum and the magnetic field of the permanent magnet is too weak to alter data stored on a magnetic medium or influence signals read or written by the magnetic heads.

To simplify the assembly of the head drum arrangement it is possible to provide the permanent magnet with a structural element acting as a centering means for the one part of the rotary transformer, which is held by the magnetic field of the permanent magnet.

According to a second aspect of the invention a magnetic tape recorder is provided, which is equipped with an inventive head drum arrangement.

BRIEF DESCRIPTION OF THE DRAWINGS

The invention can be better understood by reading the following description in connection with the accompanying drawing. In the drawing

DETAILED DESCRIPTION

Figure 1A:
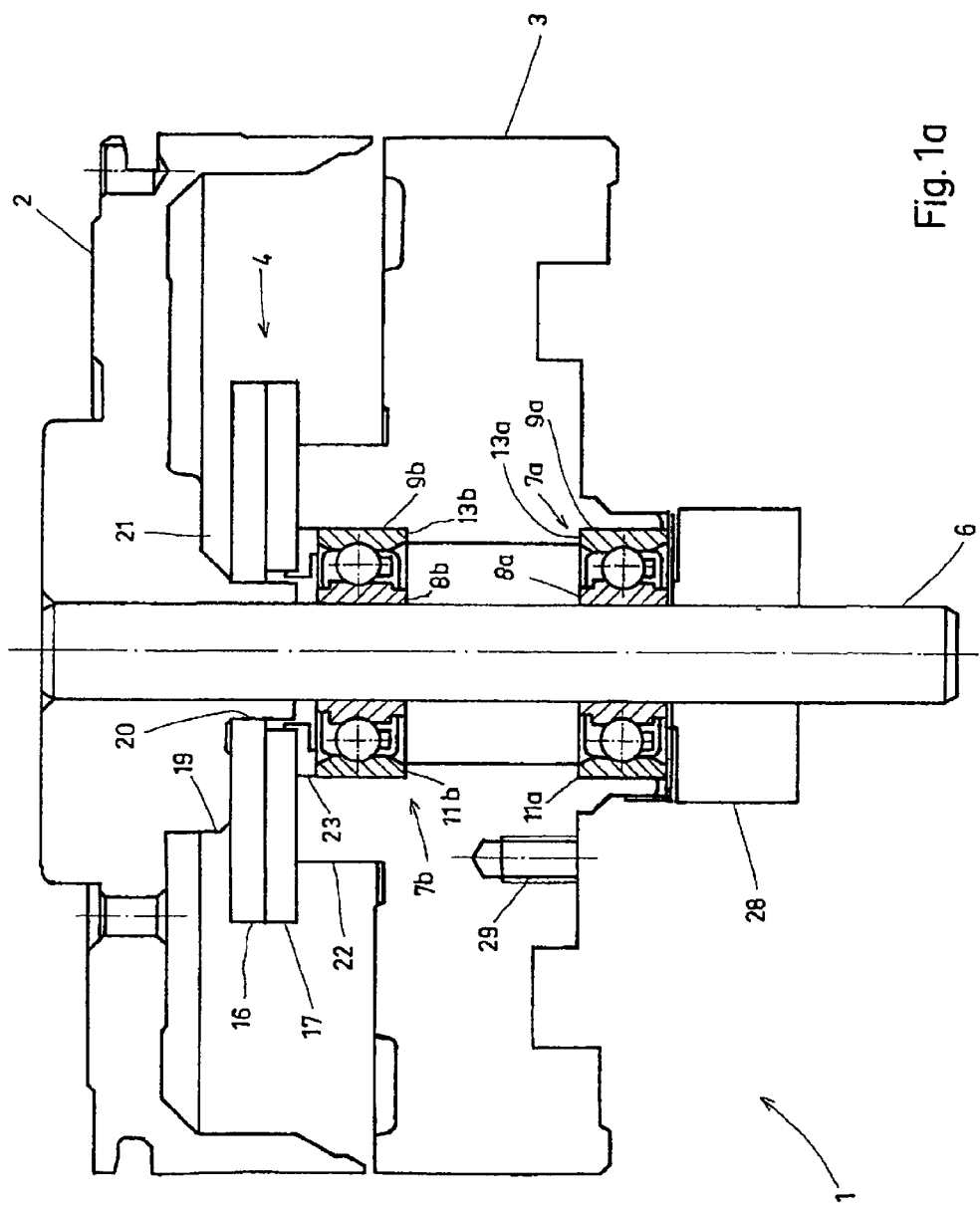
FIG. 1a shows a head drum arrangement according to the invention.

In FIG. 1a the reference number 1 refers to the head drum arrangement as a whole. The head drum 1 comprises a fixed or lower drum 2 and a rotating or upper drum 3. The upper drum 3 carries on its periphery a pair of read/write heads in a 180° configuration, which are not shown in FIG. 1a. The head drum 1 can be adapted to accommodate a higher number of read/write heads, e.g. four or six heads depending on the concrete application of the head drum. The signals read by the reading heads are transmitted from the rotating upper drum to the fixed lower drum via a rotary transformer 4. In a similar way the signals to be written by the write heads are transmitted by the rotary transformer 4 from the lower drum 2 to the upper drum 3. The lower drum 2 and the upper drum 3 are mounted on a shaft 6, which is fixed in the lower drum 2. The upper drum 3 is mounted on the shaft 6 by means of two ball bearings 7a, 7b, both having an inner ring 8a, 8b and an outer ring 9a, 9b. The outer rings 9a, 9b are accommodated in the upper drum 3 in circular seats 11a, 11b, which are connected by a bore 12, having a smaller diameter than the seats 11a, 11b. The bore 12 creates two ring shaped shoulders 13a, 13b serving as support or bearing for the outer rings 9a, 9b of the ball bearings.

Figure 1B:
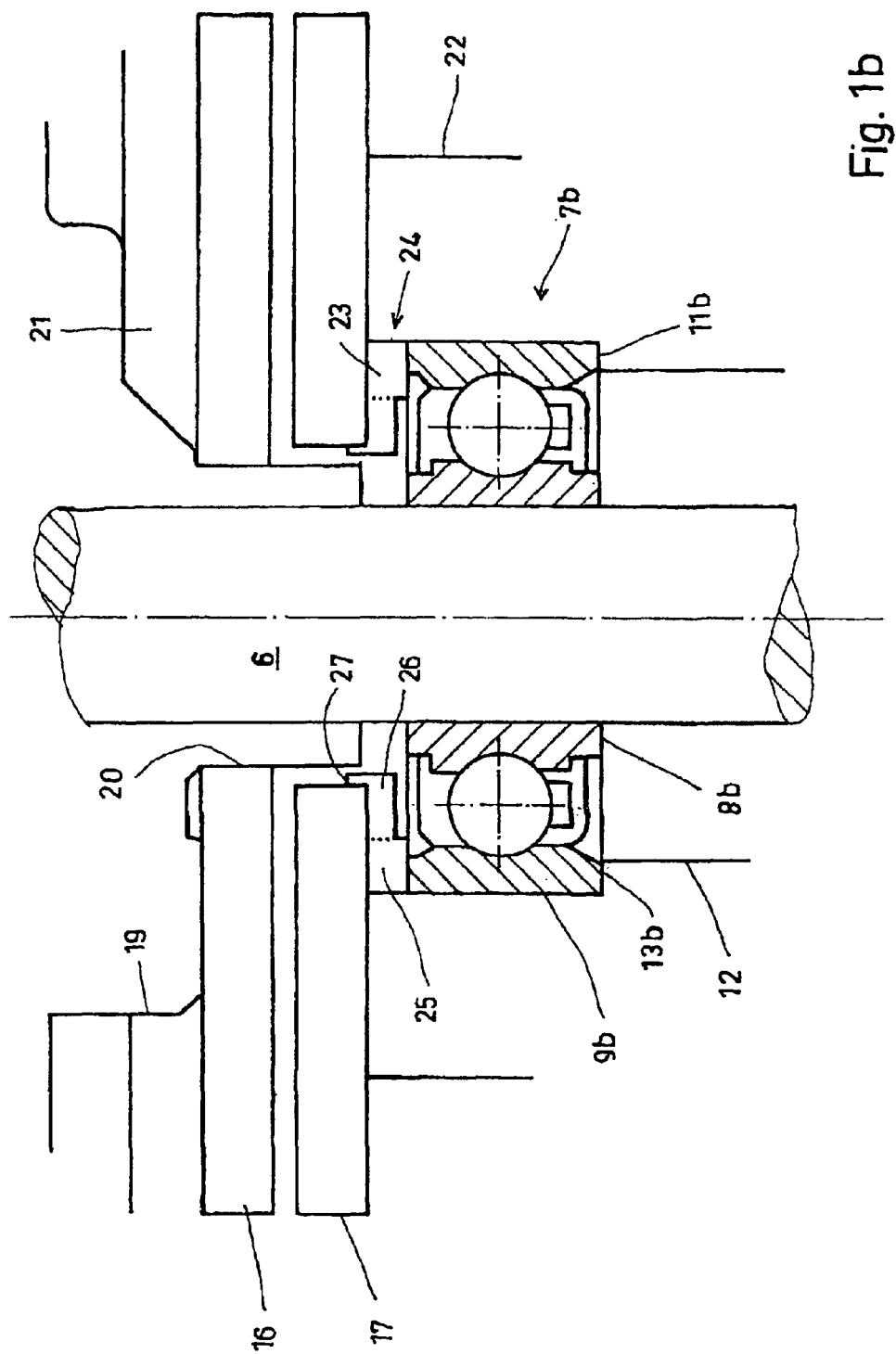
FIG. 1b shows a partial view of FIG. 1a in an enlarged scale.

The following description refers to both FIG. 1a and FIG. 1b.

The rotary transformer 4 includes a stator 16 and a rotor 17. The stator 16 rests on a hub 19, which is one piece with the lower drum 2. The hub 19 is ring shaped having a recess 21 to accommodate a cable, e.g. a Flexible Printed Cable (FPC) to connect the stator with signal processing circuits. The hub 19 continues as a collar 20. The inner surface of collar 20 is in contact with the shaft 6 and its outer surface is in contact with the inner surface of stator 16. The collar 20 effectively centers the stator 16 on the lower drum 2. The stator 16 is securely fixed on the hub 19, e.g. by glue or other conventional means known in the art.

Contrary to that the rotor 17 rests on a ring shaped hub 22. It is noted that the rotor 17 is neither glued on to the hub nor positively fixed by mechanical elements. The rotor 17 is rather non-positively maintained in the shown position by a circular permanent magnet 23 located in a ring shaped recess 24 between the rotor 17 and the ball bearing 7b. The thickness of the magnet 23 is reduced at a certain distance from the outer periphery of the magnet in radial direction defining an outer portion 25 and an inner portion 26 of the magnet (FIG. 1b). Only the outer portion 25 of the magnet 23 is in contact with the rotating outer ring 9b of a ball bearing 7b. Hence the magnet does not cause any friction.

The magnet 23 generates a permanent magnetic field effective to attract the magnet 23 to the other ring 9b of a bearing 7a and to attract the rotor 17 to the magnet 23. The rotor 17 is in contact with the ring shaped hub 22 and is pressed against it by the attractive force generated by the magnet. In this way a non-positive connection between the rotor 17 and the hub 22 is established. The upper face in FIG. 1b of the magnet 23 is in contact with the lower face of rotor 17. The inner portion 26 is provided with a ring shaped shoulder 27. The outer sidewall of the shoulder 27 is in contact with the inner circular surface of the rotor 17. In this way the shoulder 27 of the magnet 23 serves as a centering means for the rotor 17. The non-positive connection is sufficient to securely maintain the rotor 17 at its proper position. At the same time the magnetic field of the permanent magnet does not disturb or deteriorate the magnetization of the magnetic tape during recording or play back. Similarly, the signals read or recorded by the read/write heads are not influenced by the magnetic field of the permanent magnet 23.

Between the stator 16 and the rotor 17 there is a gap of 30 to 40 micrometers with a tolerance of ±10 micrometers, which is only visible in FIG. 1b. The value of the gap is determined by in a conventional way, e.g. a spacer. The whole arrangement is securely held together by a disc or preload brass 28, which is fixed on the shaft 6. The disc 28 applies a pressure against the inner rings 8a, 8b of bearings 7a, 7b. The pressure is generated by threading the disc 28 on the shaft 6 or by threading a nut, which is not shown in FIG. 1a.

The upper drum is driven by a motor, which is not shown in FIG. 2. The rotor of the motor is drivingly connected to the upper drum by a screw to be fixed in a threaded hole 29.

It is evident, that the invention is also applicable to other types of head drums, e.g. those having an upper drum, which is driven by a shaft. The inventive head drum can be utilized in any kind of magnetic tape apparatus.

Reference Numbers
1 head drum arrangement
2 lower drum
3 upper drum
4 rotary transformer
5
6 shaft
7a, 7b ball bearing
8a, 8b inner ring
9a, 9b outer ring
10
11a, 11b seat
12 bore
13a, 13b ring shaped shoulder
14
15
16 stator
17 rotor
18
19 hub
20 collar
21 recess
22 hub
23 magnet
24 recess
25 outer portion of magnet
26 inner portion of magnet
27
28 disk
29 threaded hole

What is claimed is:

1. Head drum arrangement comprising:
    a fixed lower drum and a rotating upper drum being connected by a shaft fixed in the lower drum, wherein the upper drum is mounted on the shaft by a bearing;
    a two-part rotary transformer having a fixed stator associated with the lower drum and a rotor rotating jointly and associated with the upper drum; and,
    a permanent magnet in contact with one part of the rotary transformer such that said part is held on the associated drum by the magnetic field of the permanent magnet.

2. Head drum arrangement according to claim 1 wherein a permanent magnet arranged on the rotating upper drum is in contact with the rotor of the rotary transformer such that the rotor is held on the upper drum by the magnetic field of the permanent magnet.

3. Head drum arrangement according to claim 1 wherein the permanent magnet is accommodated in a recess of the upper drum.

4. Head drum arrangement according to claim 3 wherein the recess of the upper drum is formed by seat of the bearing.

5. Head drum arrangement according to claim 1 wherein the permanent magnet is supported by the rotating ring of the bearing.

6. Head drum arrangement according to claim 1 wherein the permanent magnet is mounted close to the rotation axis and remote from the magnetic heads mounted on the circumference of the upper drum.

7. Head drum arrangement according to claim 1 wherein the magnetization of the permanent magnet is selected such that the rotor is securely held on the upper drum and the magnetic field of the permanent magnet is too weak to alter data stored on a magnetic medium or influence signals read or written by the magnetic heads.

8. Head drum arrangement according to claim 1 wherein the permanent magnet is provided with a structural element acting as a centering means for said one part of the rotary transformer.

9. Magnetic tape recorder equipped with a drum arrangement according to claim 1.

* * * * *